United States Patent [19]

Davidson

[11] Patent Number: 4,617,573

[45] Date of Patent: Oct. 14, 1986

[54] METHOD FOR OBTAINING A LINEAR CELLULAR ARRAY EMPLOYING COSINE-SQUARED ANTENNA PATTERNS

[75] Inventor: Allen L. Davidson, Crystal Lake, Ill.

[73] Assignee: Motorola, Inc., Schaumburg, Ill.

[21] Appl. No.: 683,837

[22] Filed: Dec. 19, 1984

[51] Int. Cl.$^4$ .......................................... H01Q 21/06
[52] U.S. Cl. ................................................... 343/844
[58] Field of Search ..................... 343/844, 853, 893

[56] References Cited

U.S. PATENT DOCUMENTS

| | | | |
|---|---|---|---|
| 4,128,740 | 12/1978 | Graziano | 179/2 |
| 4,144,411 | 3/1979 | Frenkiel | 325/53 |
| 4,144,496 | 3/1979 | Cunningham et al. | 325/53 |
| 4,352,110 | 9/1982 | Braak | 343/844 |
| 4,355,411 | 10/1982 | Reudink et al. | 455/33 |

*Primary Examiner*—Eli Lieberman
*Attorney, Agent, or Firm*—Donald B. Southard; Thomas G. Berry

[57] ABSTRACT

A method for obtaining a linear cellular array employing cosine-squared antenna patterns is disclosed. The array herein described provides an essentially infinite linear band of coverage utilizing only six frequencies. The embodiment of this invention provides early frequency reuse and superior co-channel interference to existing cellular systems used today. An alternate embodiment provides total area coverage along selected portions or the entire linear band of cellular coverage.

9 Claims, 11 Drawing Figures

METHOD FOR OBTAINING A LINEAR CELLULAR ARRAY EMPLOYING COSINE-SQUARED ANTENNA PATTERNS

BACKGROUND OF THE INVENTION

This invention relates generally to cellular radio telecommunications and more particularly to situating antennas to obtain cellular antenna arrays.

It is well known by those skilled in the art that for a radio telecommunications system to be efficient it must make optimum reuse of allocated frequencies to minimize the radio frequency spectrum used in a particular geographic area. Frequency reuse is particularly important in crowded metropolitan areas where frequency allocation may be difficult to obtain. However, the optimization of frequency reuse is bounded by the amount of co-channel interference that may be deemed acceptable in a telecommunications system.

Early techniques used the so called large zone approach wherein high powered transmitters were used to cover large sections (cells) of geographic area at a time. While equipment efficient, the large zone approach made poor use of the frequency spectrum. As the useable spectrum became more crowded and frequencies harder to obtain, the large zone system gave way to alternative cellular concepts.

An advance in the art was the progression to the small zone system. The small zone system employed low powered transmitters to cover small sections of geographic area at the expense of equipment. The small zone system requires a plurality of satellite transmitters and antennas located in each cell configured in various arrangements to illuminate the cell. One example of a small zone illumination technique could be the combination of an omni-directional antenna, together with 60° sectoral horn antennas positioned in the center of the cell illuminating radially outward. Thus, this implementation requires seven antennas per cell. An alternative example, offering a cost improvement, could be the use of directional antennas located on the perimeter of the cell placed 120° apart radiating inward thereby covering 360° of the cell. Thus, this improved technique required only three antennas per cell.

The small zone system provides more efficient use of the frequency spectrum by placing the lower powered transmitters (cells) closer together in order to reuse the same frequencies in the same metropolitan area. However, this frequency reuse technique has its limitations. In particular, optimization of frequency reuse is bounded by the amount of co-channel interference that may be deemed acceptable in a telecommunications system. If, for example, the small zones are placed close together, a subscriber of a telecommunications system would experience co-channel interference anifesting itself in the form of cross-talk over his telecommunications channel.

Therefore, the need in the cellular telecommunications marketplace is to develop a system to balance the conflicting needs of high frequency reuse and low co-channel interference.

SUMMARY OF THE INVENTION

The embodiment of this invention is to employ highly directional antennas having a cosine-squared radiation pattern in the small zone cellular concept. These antennas, when situated in the particular arrangement disclosed herein, provide a cellular pattern that is substantially linear in semblance. As an example, a linear cellular pattern may be utilized in metropolitan and rural areas to provide cellular coverage for interstate highways, continental coast lines, pennisulas or islands.

Therefore, it is an object of the present invention to provide a linear cellular pattern that enables optimum frequency reuse.

It is a further object of the present invention to provide a linear cellular pattern which mimizes co-channel interference to an acceptable level.

It is yet a further object of the present invention to provide a cellular pattern that can extend indefinitely in all directions using a fixed small number of frequencies.

Accordingly, these and other objects are achieved in the present invention for obtaining a linear cellular pattern.

BRIEF DESCRIPTION OF THE DRAWINGS

The features of the present invention which are believed to be novel are set forth with particularity in the appended claims. The invention, together with further objects and advantages thereof may be understood by reference to the following description taken in conjunction with the accompanying drawings and the several figures of which like reference numerals identify like elements and in which:

DESCRIPTION OF THE PREFERRED EMBODIMENT

Figure 1:
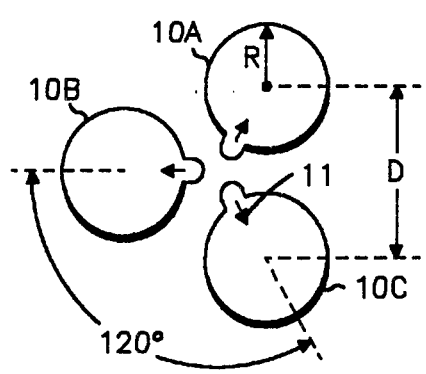
FIG. 1 shows an area illuminated by three cosine squared antenna patterns placed 120° apart.

Referring now to FIG. 1, the illumination coverage of three cosine-squared patterns are shown radiating outward from each other at 120° angles, for example as indicated by antenna reference arrow 11. When subjected to actual propagation losses, an antenna with a cosine-squared radiation pattern illuminates an area that closely approximates a circle. The only exception is a small back lobe radiating for a small distance in the opposite direction of the main lobe. The ideal cosine-squared radiation pattern has a back lobe power of zero, however, in practical applications the back lobes obtainable are approximately 35 db below the main lobe.

It is well known in the art that cellular systems today are designed for a worst case 20 db RF signal-to-interference ratio. This level of interference is maintained by selection of an appropriate D/R (distance between the cells divided by the cell radius) ratio. Antennas with a cosine-squared pattern (having 32 db back lobes), firing away from each other at 120° angles, can obtain a D/R ratio as low as 2.7:1. This spacing will give a signal to interference ratio of 23 db, 3 db better than most cellular systems designed today.

Figure 2:
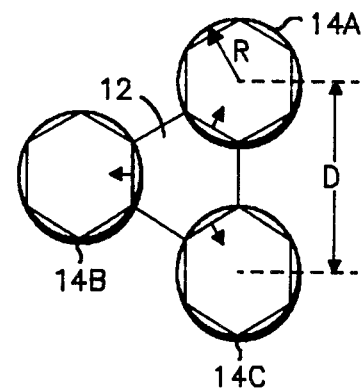
FIG. 2 shows the illumination patterns of FIG. 1 presented in a cellular configuration.

Referring now to FIG. 2, the three cosine-squared antenna patterns of FIG. 1 have been circumsribed about the traditional hexagonal cellular pattern and positioned around a center cell 12 forming a cell module. Positioning cells 14a–14c around cell 12 provides a D/R ratio of 3:1, a greater margin than required. Therefore, the D/R ratio realized by the use of antennas having a cosine-squared radiation pattern allows close positioning of cells having the same frequency, effectuating early frequency reuse together with a superior co-channel interference ratio.

Figure 3A:
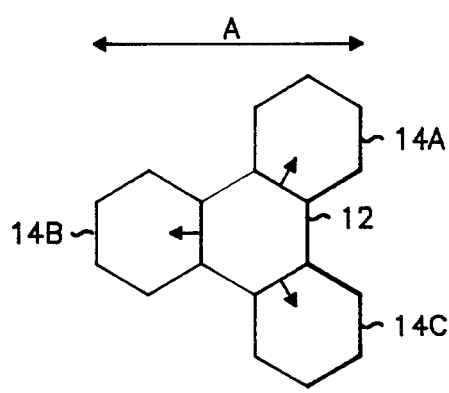
FIGS. 3a–3d shows the steps preferred for establishing a cell cluster.
Figure 3B:
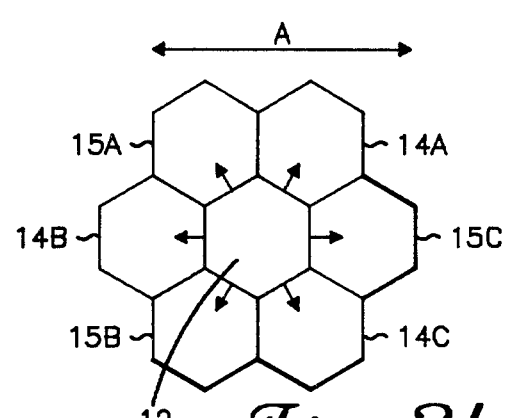
Figure 3C:
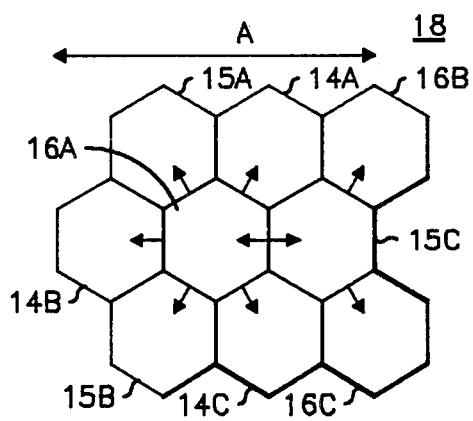
Figure 3D:
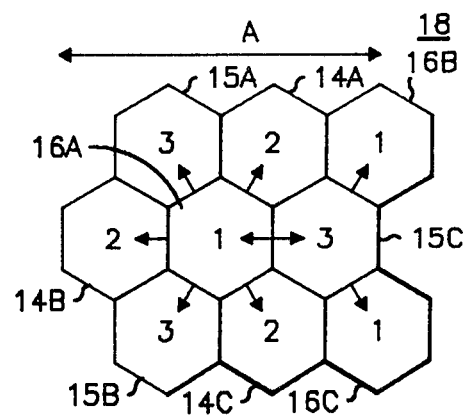

Referring now to FIGS. 3a–3d, the preferred method of constructing a cellular cluster is shown. FIG. 3a shows a cellular module having a triad of cells 14a–14c conterminously positioned about a center cell 12 at 12.0° angles with respect to each other. Each of these cells has a directional antenna positioned on the cell perimeter adjacent to center cell 12 such that the radiation is directed outward from center cell 12 at approximately 120° with respect to each other. The cellular module in FIG. 3a is positioned in the geographic area to be covered such that one of the directional antennas is aligned with the linear direction of coverage desired as indicated by a reference arrow A. In FIG. 3b, a second cellular module having cells 15a–15c is conterminously interleaved with cell module 14a–14c such that the center cell 12 of the two cell modules are merged. FIG. 3c shows a third cell module having cells 16a–16c conterminously interleaved with the first and second cell modules such that one of the cell triads of the third module is merged with the common center cell of the first and second cell modules, and center cell 12 of the third cell module is merged with one cell of either the second or third cell module. Lastly, as shown in FIG. 3d, a first frequency is then assigned to the common center cell 12 and the third cell module 16a–16c. A second frequency is assigned to the cells of the first cell module 14a–14c. Lastly, a third frequency is assigned to the second cell module 15a–15c. Thus a method for constructing and assigning frequencies to a cellular cluster is disclosed.

Figure 4A:
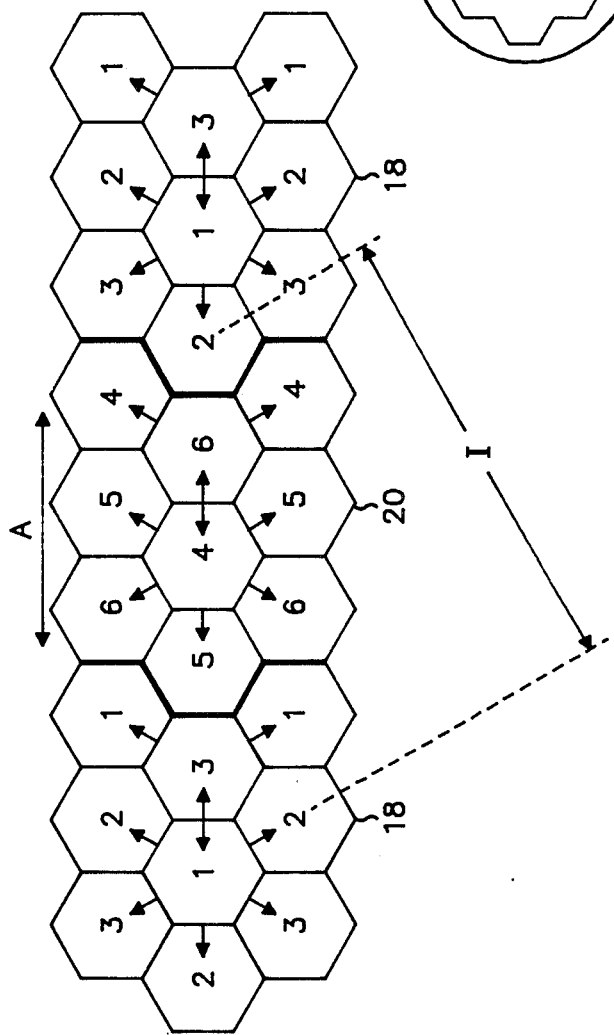
FIG. 4a–4b shows cellular clusters cascaded to cover a linear geographic area.

Referring now to FIG. 4a a second cell cluster 20 is constructed in a like manner to cell cluster 18 assigning frequencies 4–6 in place of 1–3 respectively. Cell cluster 20 is then and positioned in tandem along reference direction A of the geographic area to be covered. On the opposing face of cell cluster 20, a second cell cluster 18 may be placed to continue coverage in that direction if desired.

The construction of a cellular cluster in the above described manner holds inter-cluster co-channel interference to a minimum. However, to assure acceptable system performance, co-channel interference between cell clusters must also be controlled. The critical distance is the interference distance I shown in FIG. 4a. Those skilled in the art will appreciate that this interference distance is a function of the height of the antenna. For example, to maintain the required co-channel interference ratio between cell clusters the individual cell size required would be five miles or greater for an antenna at 1000 feet, four miles or greater for an antenna at 500 feet, and three miles or greater for an antenna at 230 feet. In practice, however, this is not a significant limitation because the proper antenna height can be selected when the antenna system is implemented.

Figure 4B:
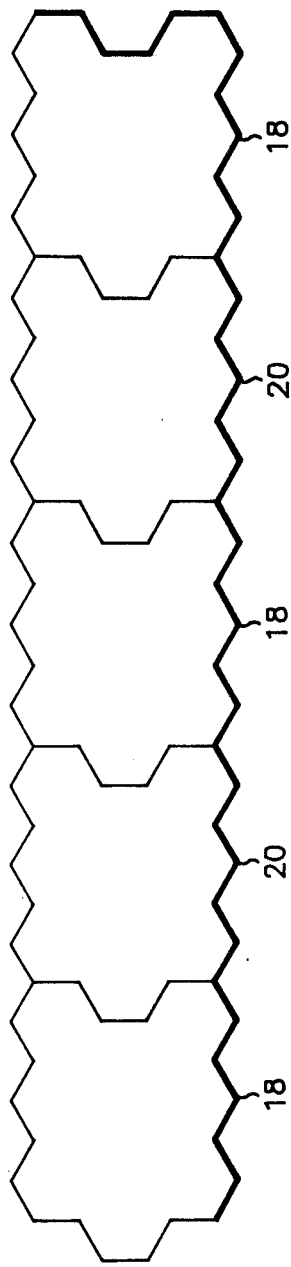

FIG. 4b shows cell clusters 18 and 20 cascaded in an alternating manner that for all practical purposes can be repeated indefinitely to cover any linear area. Thus, using only six frequencies, a practically indefinite band of geographic area can be provided with cellular telecommunications.

Those skilled in the art will appreciate that frequencies assignments 1–6 need not be single frequencies, but may in fact be frequency groups provided sufficient frequency spectrum is available. Also, those skilled in the art will realize that the directional antenna employed in each cell may be a single antenna or two antennas; one transmitting and one receiving.

Figure 5:
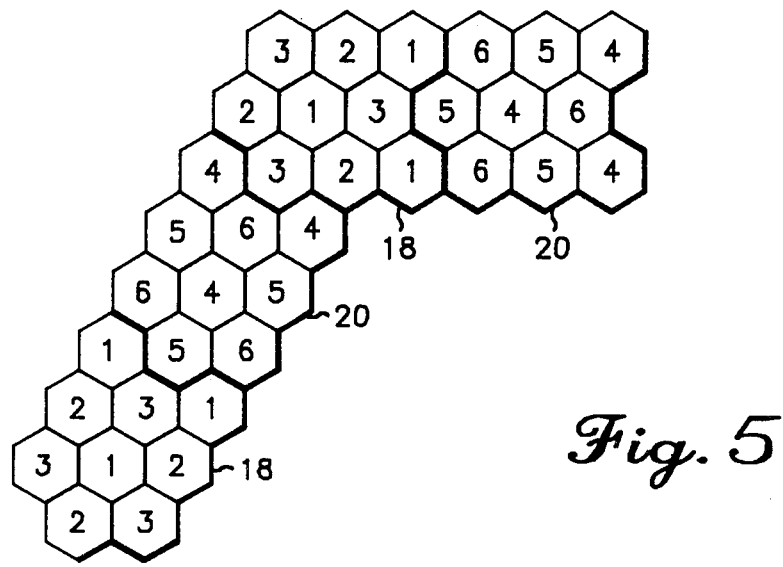
FIG. 5 shows cellular clusters positioned to enable the illumination coverage to change directions.

Referring now to FIG. 5, an alternate method of positioning cell clusters is shown. It will be appreciated by those skilled in the art that it may be desirable to alter the direction of the linear band of cellular illumination. For example, inter-state highways may temporarily assume a different direction to avoid a natural obstruction. The method of positioning cellular clusters disclosed herein facilitates such a change in direction. Simply place the cellular cluster that would ordinarily be aligned with the original direction of coverage (as shown in FIG. 4b) in the direction desired (as shown in FIG. 5).

Figure 6:
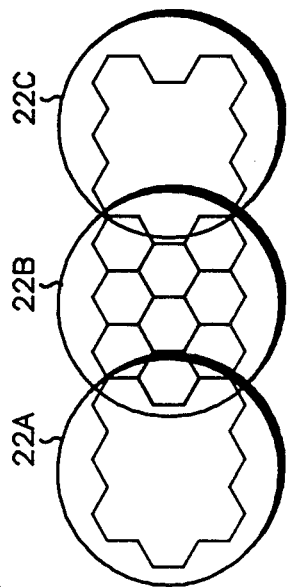
FIG. 6 shows an alternate embodiment where omnidirectional antennas are added to provide illumination to individual cell clusters.

FIG. 6 shows an alternate embodiment wherein an omni-directional antenna is positioned centrally in a cell cluster to provide illumination of the entire cell cluster. This embodiment may be useful for signalling purposes, or other optional features and enhancements of an individual cellular system.

Figure 7:
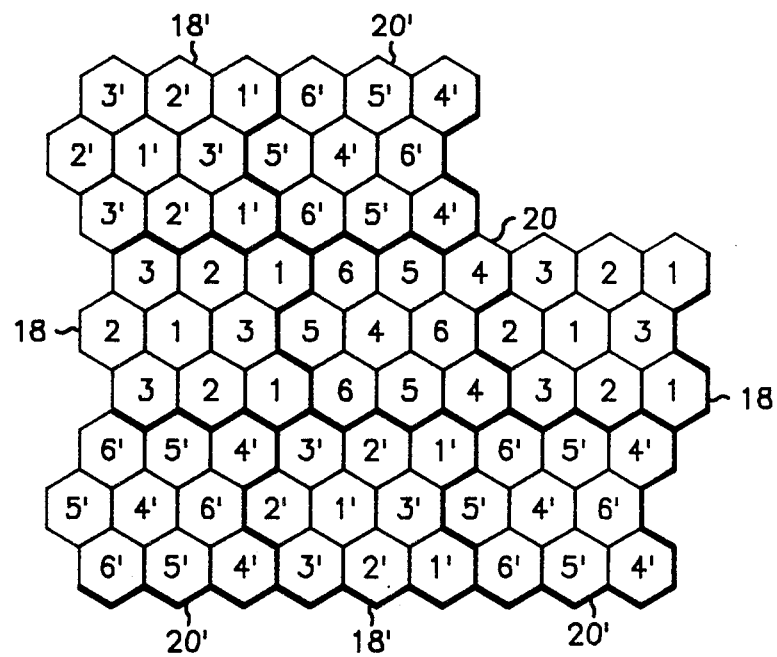
FIG. 7 shows an alternate embodiment whereby total area coverage is obtained.

Referring now to FIG. 7, yet another alternate embodiment of the present invention is shown. Those skilled in the art will appreciate that total area may be desirable either at selected portions or along the entire linear band of cellular illumination. For example, an inter-state highway may pass through a major metropolitan area that the original linear band may not totally cover. If total area coverage is desired, and frequency allocation is obtainable, total area coverage may be realized utilizing the present method as shown in FIG. 7. Simply construct cell clusters 18' and 20' using frequencies 1'–3' and 4'–6' respectively, using the same method employed to construct cell clusters 18 and 20 as shown in FIGS. 3a–3d. Next, form linear bands of cellular illumination using cell clusters 18' and 20' in the same manner shown for cell clusters 18 and 20 in FIGS. 4a–4b. Lastly, align the linear bands in an alternating longitudinal manner, (as shown in FIG. 7) until the desired geographic coverage is obtained.

While a particular embodiment of the invention has been described and shown, it should be understood that the invention is not limited thereto since many modifications may be made. It is therefore contemplated to cover by the present application any and all such modifications that may fall within the true spirit and scope of the basic underlying principles disclosed and claimed herein.

What is claimed is:

1. A method for obtaining a linear cellular pattern, over a geographic area, with optimum frequency reuse and minimum co-channel interference, comprising the steps of:

establishing a first, second and third cell module each having a triad of geometrically shaped cells tangentially spaced at substantially 120° about a center cell, each cell having a directional antenna located on the cell perimeter positioned adjacent to said center cell such that at least said antennas of said triad radiate outwardly at approximately 120° from each other;

establishing a first cell cluster by combining said first, second and third cell modules such that said triads of said first and second cell modules are conterminously interleaved and said center cells are merged into a common center cell, and said triad of said third cell module is conterminously interleaved with said first and second cell modules such that one cell of said third triad is merged with said common center cell of said first and second cell modules, and said center cell of said third cell module is merged with one cell of either said first or second cell module such that said cell cluster has a substantially longitudinal semblance;

assigning said first, second and third cell modules a first, second or third frequency;

positioning said first cell cluster in a geographic area such that said first cell cluster is aligned with the linear direction of the geographic area to be covered.

2. The method for obtaining a linear cellular pattern, as described in claim 1, wherein said geometrically shaped cell comprises a cell having a hexagonal semblance.

3. The method of claim 2, wherein each of said directional antennas comprise an antenna having a cosine-squared illumination pattern.

4. The method for obtaining a linear cellular pattern, as described in claim 3, wherein said method further comprises the steps of:

establishing a second cell cluster utilizing the method for establishing said first cell cluster;

assigning a fourth frequency to said triad of cells of said third cell module, a fifth frequency to said triad of cells of said second cell module and a sixth frequency to said triad of cells of said third cell module;

conterminously positioning said second cell cluster in a tandem configuration to at least one face of said first cell cluster aligned with said linear direction of said geographic area to be covered; and repeating in an alternate manner said tandem positioning of said first and second cell clusters until said geographic area is covered.

5. The method for obtaining a linear cellular pattern, as described in claim 4, wherein said first and second cell clusters each have at least one omni-directional antenna positioned substantially central to said geographic area covered by said first and second cell clusters.

6. The method for obtaining a linear cellular pattern, as described in claim 4, wherein a method for changing the direction of said linear pattern, terminous in said first cell cluster, comprises the steps of:

conterminously positioning said second cell cluster to said first cell cluster such that the logitudinal semblance of said second cell cluster is directed angularly away from said first cell cluster;

repeating in an alternate manner said tandem positioning of said first and second cell clusters in a direction, said direction aligned with said longitudinal semblance of said second cell cluster.

7. The method for obtaining a linear cellular pattern, as described in claim 4, wherein a method for changing the direction of said linear pattern, terminous in said second cell cluster, comprises the steps of:

conterminously positioning said first cell cluster to said second cell cluster such that the logitudingal semblance of said first cell cluster is directed angularly away from said second cell cluster;

repeating in an alternate manner said tandem positioning of said first and second cell clusters in a direction, said direction aligned with said logitudinal semblance of said first cell cluster.

8. A method for obtaining a cellular pattern, as described in claim 4, wherein said linear pattern is employed to provide total area coverage comprising the steps of:

establishing a third and fourth cell cluster utilizing the method for establishing said first cell cluster;

assigning said first, second and third cell module of said third cell cluster a seventh, eighth or ninth frequency;

assigning said first, second and third cell module of said fourth cell cluster a tenth, eleventh, or twelfth frequency;

conterminously positioning said first and second cell clusters in an alternating tandem arrangement forming a first linear pattern having a substantially longitudinal semblance;

conterminously positioning said third and fourth cell clusters in an alternating tandem arrangement forming a second linear pattern having a substantially longitudinal semblance;

conterminously positioning said first and second linear patterns in an alternating longitudinal arrangement until said geographic area is covered.

9. The method for obtaining a linear cellular pattrn, as described in claim 8, wherein said first, second, third and fourth cell clusters each have at least one omni-directional antenna positioned substantially central to said geographic area covered by said first, second, third and fourth cell clusters.

* * * * *